United States Patent
Baid et al.

(10) Patent No.: US 12,325,426 B2
(45) Date of Patent: Jun. 10, 2025

(54) METHOD AND APPARATUS FOR GENERATING PERSONALIZED SPLINES

(71) Applicant: HERE GLOBAL B.V., Eindhoven (NL)

(72) Inventors: Hitesh Baid, Palghar (IN); Leon Stenneth, Chicago, IL (US); Rakesh Singh, Navi Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 483 days.

(21) Appl. No.: 17/719,953

(22) Filed: Apr. 13, 2022

(65) Prior Publication Data

US 2023/0331237 A1    Oct. 19, 2023

(51) Int. Cl.
| | |
|---|---|
| *B60W 40/072* | (2012.01) |
| *B60W 40/076* | (2012.01) |
| *B60W 50/14* | (2020.01) |
| *B60W 60/00* | (2020.01) |
| *G01C 21/30* | (2006.01) |
| *G01C 21/34* | (2006.01) |

(52) U.S. Cl.
CPC ........ *B60W 40/072* (2013.01); *B60W 40/076* (2013.01); *B60W 50/14* (2013.01); *B60W 60/0051* (2020.02); *G01C 21/30* (2013.01); *G01C 21/3407* (2013.01); *B60W 2552/30* (2020.02)

(58) Field of Classification Search
CPC .......... B60W 40/072; B60W 60/0051; B60W 40/076; B60W 50/14; B60W 2552/30; G01C 21/30; G01C 2552/30
USPC ........................................................... 701/23
See application file for complete search history.

(56) References Cited

U.S. PATENT DOCUMENTS

| | | | | |
|---|---|---|---|---|
| 7,692,655 | B2 * | 4/2010 | Ni | G06T 17/05 |
| | | | | 345/442 |
| 7,751,973 | B2 | 7/2010 | Ibrahim | |
| 8,583,366 | B2 * | 11/2013 | Iida | G01C 21/3819 |
| | | | | 701/450 |
| 8,634,980 | B1 * | 1/2014 | Urmson | G06T 7/74 |
| | | | | 701/23 |
| 8,725,474 | B2 * | 5/2014 | Dorum | G01C 21/3819 |
| | | | | 345/473 |
| 9,189,897 | B1 * | 11/2015 | Stenneth | B60W 50/14 |
| 9,592,833 | B2 | 3/2017 | Denigan et al. | |
| 9,754,501 | B2 | 9/2017 | Stenneth | |
| 10,361,802 | B1 * | 7/2019 | Hoffberg-Borghesani | ............. |
| | | | | G06F 3/00 |
| 10,591,920 | B2 * | 3/2020 | Lv | G05D 1/0217 |

(Continued)

FOREIGN PATENT DOCUMENTS

DE    102016215046 A1    2/2018

*Primary Examiner* — Luis A Martinez Borrero
(74) *Attorney, Agent, or Firm* — Jeffrey R. Moisan; HERE GLOBAL B.V.

(57) ABSTRACT

A method, apparatus, and user interface are provided for generating personalized splines. For example, one or more geometries that represent a portion of a road network are identified and a first spline curve is calculated from the one or more geometries. One or more additional geometries that represent a different portion of the road network are then interpolated, by a processor, and the processor then calculates at least a second spline curve from the one or more additional geometries, wherein the second spline curve is derived, at least in part, from personalized driving preference data.

10 Claims, 8 Drawing Sheets

(56) References Cited

U.S. PATENT DOCUMENTS

| | | | | |
|---|---|---|---|---|
| 10,684,133 | B2* | 6/2020 | Takeda | G01C 21/3602 |
| 11,067,995 | B2* | 7/2021 | Weiser | B60W 30/0956 |
| 11,327,493 | B1* | 5/2022 | Silver | B62D 6/00 |
| 11,615,563 | B2* | 3/2023 | Goldman | B60W 30/12 345/442 |
| 11,713,979 | B2* | 8/2023 | Stenneth | B60W 60/0055 701/23 |
| 11,755,024 | B2* | 9/2023 | Weiser | G08G 1/163 701/26 |
| 11,988,518 | B2* | 5/2024 | Zhang | G01C 21/3815 |
| 12,030,502 | B2* | 7/2024 | Malach | G01C 21/20 |
| 2010/0082248 | A1* | 4/2010 | Dorum | G06F 16/29 701/533 |
| 2010/0082307 | A1* | 4/2010 | Dorum | G01C 21/3822 703/2 |
| 2011/0218724 | A1* | 9/2011 | Iida | G01C 21/3844 701/1 |
| 2014/0244125 | A1* | 8/2014 | Dorum | B60W 40/109 701/1 |
| 2014/0303828 | A1* | 10/2014 | Joshi | B60W 30/12 701/23 |
| 2015/0239478 | A1* | 8/2015 | Dorum | G08B 23/00 701/29.1 |
| 2015/0338223 | A1* | 11/2015 | Letz | G01C 21/3484 701/533 |
| 2016/0023661 | A1* | 1/2016 | Dorum | B60W 40/06 702/167 |
| 2016/0042650 | A1* | 2/2016 | Stenneth | B60W 50/085 701/23 |
| 2016/0178381 | A1* | 6/2016 | Lynch | G01C 21/3848 701/41 |
| 2016/0187144 | A1* | 6/2016 | Modica | G01C 21/005 382/154 |
| 2016/0188996 | A1* | 6/2016 | Modica | G06F 16/50 382/203 |
| 2016/0189385 | A1* | 6/2016 | Modica | G06T 7/73 382/103 |
| 2016/0192154 | A1* | 6/2016 | Modica | G01S 17/06 455/456.1 |
| 2016/0245657 | A1* | 8/2016 | Dorum | G01C 21/3881 |
| 2016/0275667 | A1* | 9/2016 | Modica | G01S 17/06 |
| 2016/0291834 | A1* | 10/2016 | De Vallois | G06T 13/20 |
| 2017/0010617 | A1* | 1/2017 | Shashua | B60W 60/00 |
| 2017/0010618 | A1* | 1/2017 | Shashua | G05D 1/0246 |
| 2017/0011343 | A1* | 1/2017 | Stenneth | B25J 9/163 |
| 2018/0141562 | A1* | 5/2018 | Singhal | G05D 1/646 |
| 2018/0238696 | A1* | 8/2018 | Takeda | G08G 1/16 |
| 2018/0348762 | A1* | 12/2018 | Hilnbrand | G01C 21/30 |
| 2019/0009794 | A1* | 1/2019 | Toyoda | B60W 50/12 |
| 2019/0033871 | A1* | 1/2019 | Lee | G06V 10/44 |
| 2019/0187707 | A1 | 6/2019 | Zheng et al. | |
| 2020/0164897 | A1* | 5/2020 | Krome | B60W 50/14 |
| 2020/0223449 | A1* | 7/2020 | Tsuji | G08G 1/09626 |
| 2020/0257301 | A1* | 8/2020 | Weiser | G08G 1/163 |
| 2020/0393261 | A1* | 12/2020 | Zhang | G01C 21/3492 |
| 2020/0398855 | A1* | 12/2020 | Thompson | G01C 21/30 |
| 2020/0400439 | A1* | 12/2020 | Thompson | G01C 21/3697 |
| 2021/0055119 | A1* | 2/2021 | Wiesenberg | G01C 21/387 |
| 2021/0063162 | A1* | 3/2021 | Moskowitz | G01C 21/28 |
| 2021/0129858 | A1 | 5/2021 | Omasta et al. | |
| 2021/0311486 | A1* | 10/2021 | Weiser | G06V 20/56 |
| 2022/0001871 | A1* | 1/2022 | Malach | B60W 50/0097 |
| 2022/0001872 | A1* | 1/2022 | Taieb | G06T 7/70 |
| 2022/0009518 | A1* | 1/2022 | Malach | G01C 21/3867 |
| 2022/0063639 | A1* | 3/2022 | Stenneth | B60W 40/06 |
| 2022/0063654 | A1* | 3/2022 | Beaurepaire | B60W 50/14 |
| 2022/0065656 | A1* | 3/2022 | Young | B60W 60/0059 |
| 2022/0067813 | A1* | 3/2022 | Beaurepaire | G01C 21/3484 |
| 2022/0080976 | A1* | 3/2022 | Genovese | H04W 4/027 |
| 2022/0215603 | A1* | 7/2022 | Goldman | B60W 30/18009 |
| 2023/0031485 | A1* | 2/2023 | Oh | G08G 1/012 |
| 2023/0136710 | A1* | 5/2023 | Guberman | G06V 10/762 701/450 |
| 2023/0154073 | A1* | 5/2023 | Singh | G01C 21/3602 345/660 |
| 2023/0159050 | A1* | 5/2023 | Hershkovich | G06V 20/58 701/26 |
| 2023/0159053 | A1* | 5/2023 | Hershkovich | G01C 21/3889 701/25 |
| 2023/0166763 | A1* | 6/2023 | Goto | B60W 40/076 701/23 |
| 2023/0182637 | A1* | 6/2023 | Hershkovich | G06T 7/60 340/468 |
| 2023/0196643 | A1* | 6/2023 | Shen | G06T 7/20 345/441 |
| 2023/0324183 | A1* | 10/2023 | Beaurepaire | G01C 21/3644 |
| 2023/0341239 | A1* | 10/2023 | Ferencz | G01C 21/3819 |
| 2024/0044662 | A1* | 2/2024 | Zhang | G08G 1/0141 |

* cited by examiner

METHOD AND APPARATUS FOR GENERATING PERSONALIZED SPLINES

TECHNOLOGICAL FIELD

An example embodiment relates generally to a method, apparatus, computer readable storage medium, and computer program product for generating personalized splines and, more particularly, for generating personalized splines based upon driving behavior and preferences of an end user.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on-board vehicles do have limitations and do not collect and/or provide for all of the different types of information that would be useful in various applications. One specific example limitation is that of route generation and driving guidance.

BRIEF SUMMARY

A method, apparatus, computer readable storage medium, user interface, and computer program product are provided in accordance with an example embodiment to generate splines. In this regard, the method, apparatus, computer readable storage medium, user interface, and computer program product of an example embodiment may utilize image data collected by a vehicle to identify a roadway. The reliance upon the collection and analysis of image data may supplement the information provided by other sensors on board the vehicle and allow for the provision of different information that is useful for a variety of applications.

In an example embodiment, a method may be provided, comprising identifying one or more geometries that represent a portion of a road network and calculating, by a processor, a first spline curve from the one or more geometries. The portion of a road network may include curves or bends in a road network and the one or more geometries may include road boundaries, lane lines, center lines, shoulders, etc. Per this method, the processor may interpolate, by a processor, one or more additional geometries that represent a different portion of the road network, and calculate, by a processor, at least a second spline curve from the one or more additional geometries, wherein the second spline curve is derived, at least in part, from personalized driving preference data.

As mentioned above, in some embodiments the one or more geometries identified may be road boundaries, lane lines, lane markers, medians, etc. The geometries may also be naturally occurring such as wear patterns, tire tracks, skid marks etc. These various kinds of geometries may be identified by image data captured from a vehicle camera and stored in a database. The splines generated by the method may also be stored in the same or a different database. Once generated, the spline curves may be used to generate alerts, control autonomous driving vehicles, etc.

The personalized driving preference data may, in some embodiments, be manually provided or obtained by monitoring the driving patterns of a given end user to determine the path they typically take around turns, curves, etc. This data can then be used to generate splines which a personalized in nature.

In another embodiment, a user interface for providing a user with a route to a destination may comprising the steps of receiving input upon a user device from the user that indicates driving preferences and accessing a geographic database to obtain data that represent roads in a region in which the user device is operating. The user interface may then determine a route to the destination by selecting road segments to form a continuous route to the destination and display the determined route or portion thereof to the user, wherein the determined route displayed includes a plurality of splines derived at least in part from the user's driving preferences.

The use interface described herein may also calculate the spline curves based upon one or more geometries that represent portions of a road. These one or more geometries may be identified by image data and all data including image data, spline data, etc. may be stored in a database. The spline data can then be used to update map layers, generate alerts, activate autonomous driving functions, etc.

In yet another embodiment, an apparatus may be configured to calculate a plurality of splines, the apparatus comprising at least one processor and at least one memory storing computer program code, the at least one memory and the computer program code configured to, with the processor, cause the apparatus to at least obtain image data of at least one roadway and identify one or more geometries that represent a portion of the at least one roadway. The apparatus may then calculate, by a processor, a first spline curve from the one or more geometries and interpolating, by a processor, one or more additional geometries that represent a different portion of the roadway. The apparatus may then calculate, by a processor, at least a second spline curve from the one or more additional geometries, wherein the second spline curve is derived, at least in part, from personalized driving preference data. In some embodiments, the one or more geometries that represent a portion of the at least one roadway are road boundaries.

The apparatus above and others may be further configured to, with the processor, cause the apparatus to receive an indication of a location of the vehicle, and wherein the at least one memory and the computer program code are configured to, with the processor, cause the apparatus to display a plurality of splines proximate the location of the vehicle. The apparatus may then be configured to, with the processor, cause the apparatus to update a map database, activate or control an autonomous driving mode in response to the calculated spline curves, etc.

Also, a computer program product may be provided. For example, a computer program product comprising instructions which, when the program is executed by a computer, cause the computer to carry out the steps described herein.

BRIEF DESCRIPTION OF THE DRAWINGS

Figure 1:
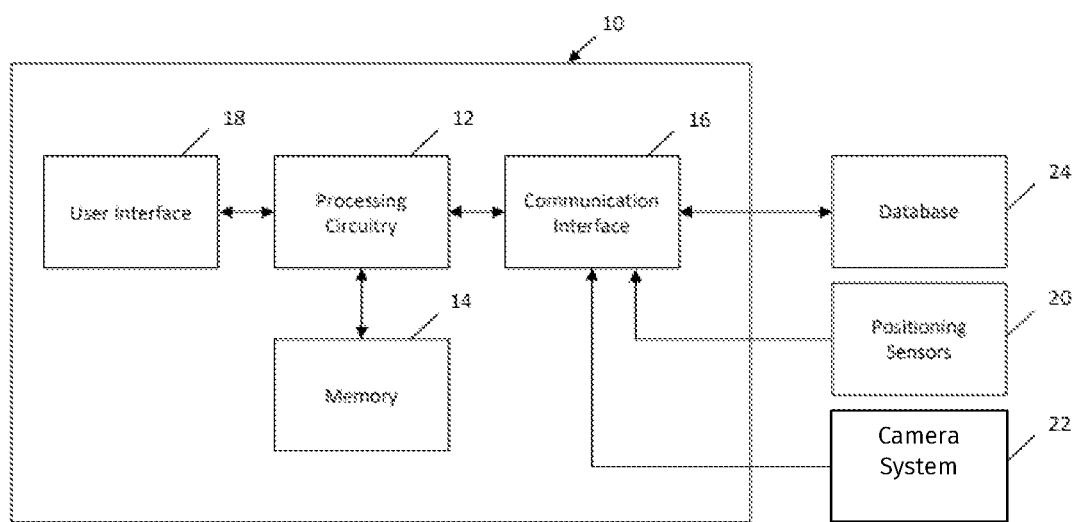
Figure 2:
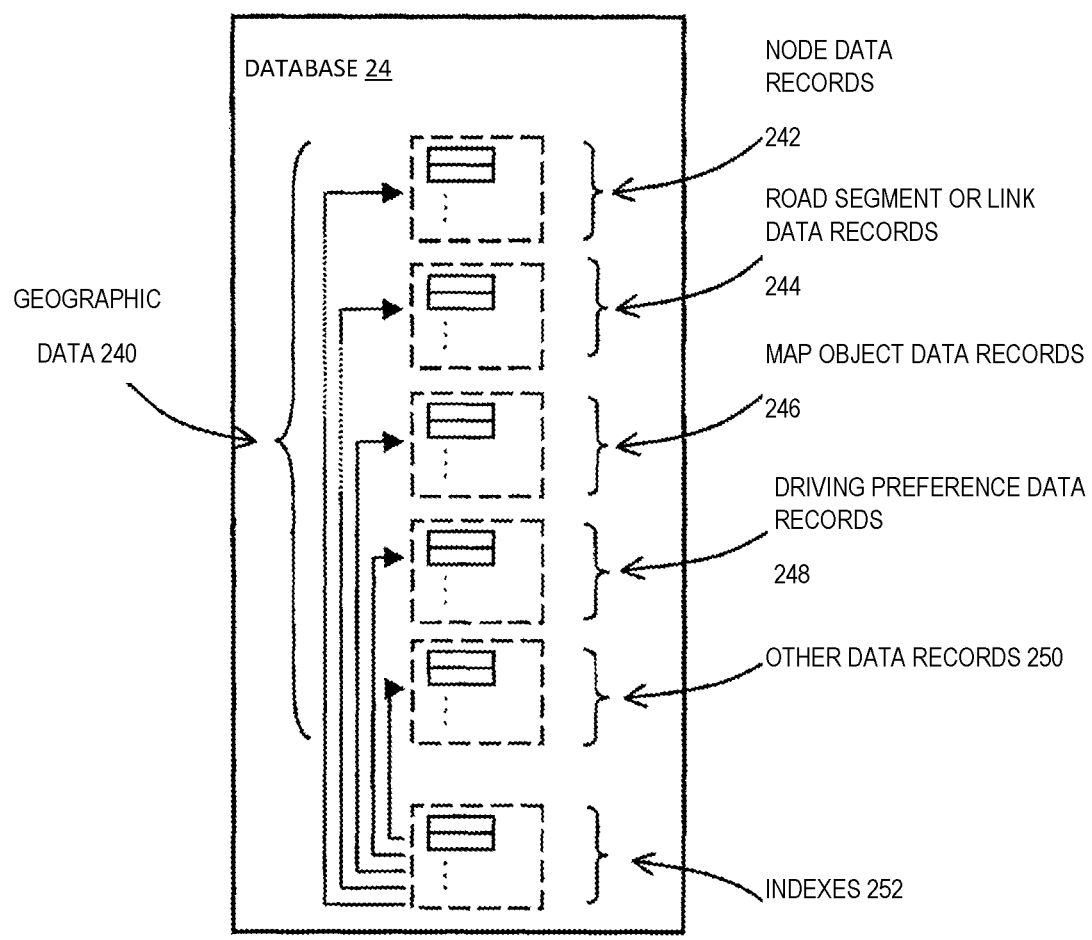
Figure 3A:
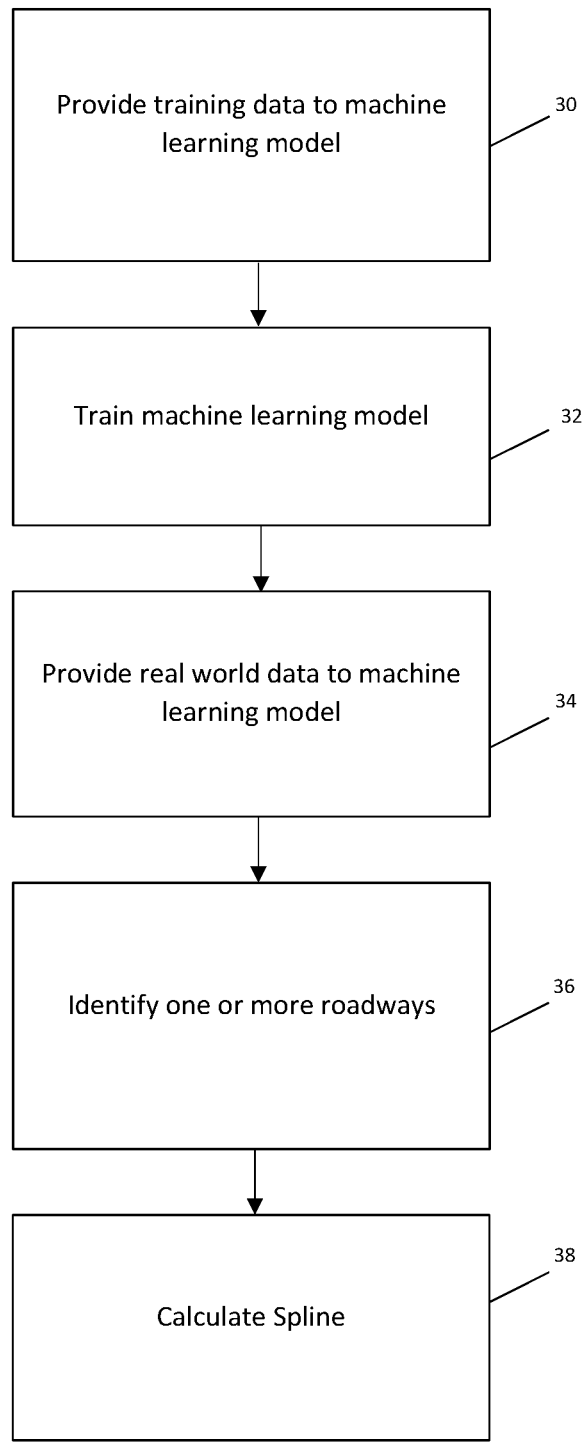
Figure 3B:
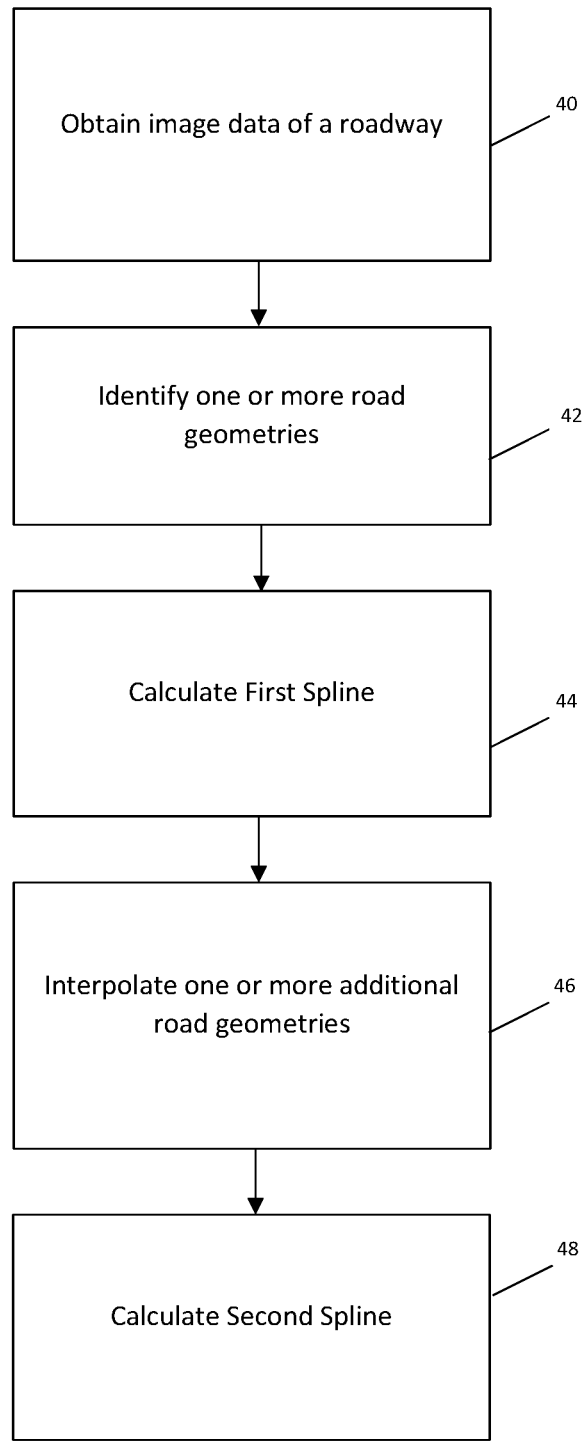
Figure 3C:
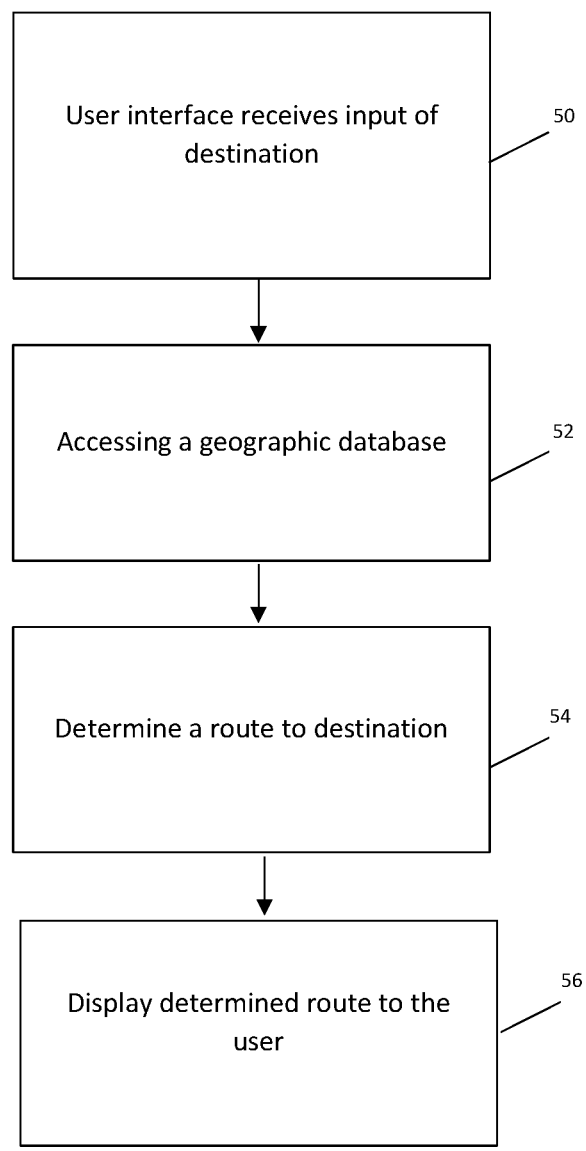
Figure 4:
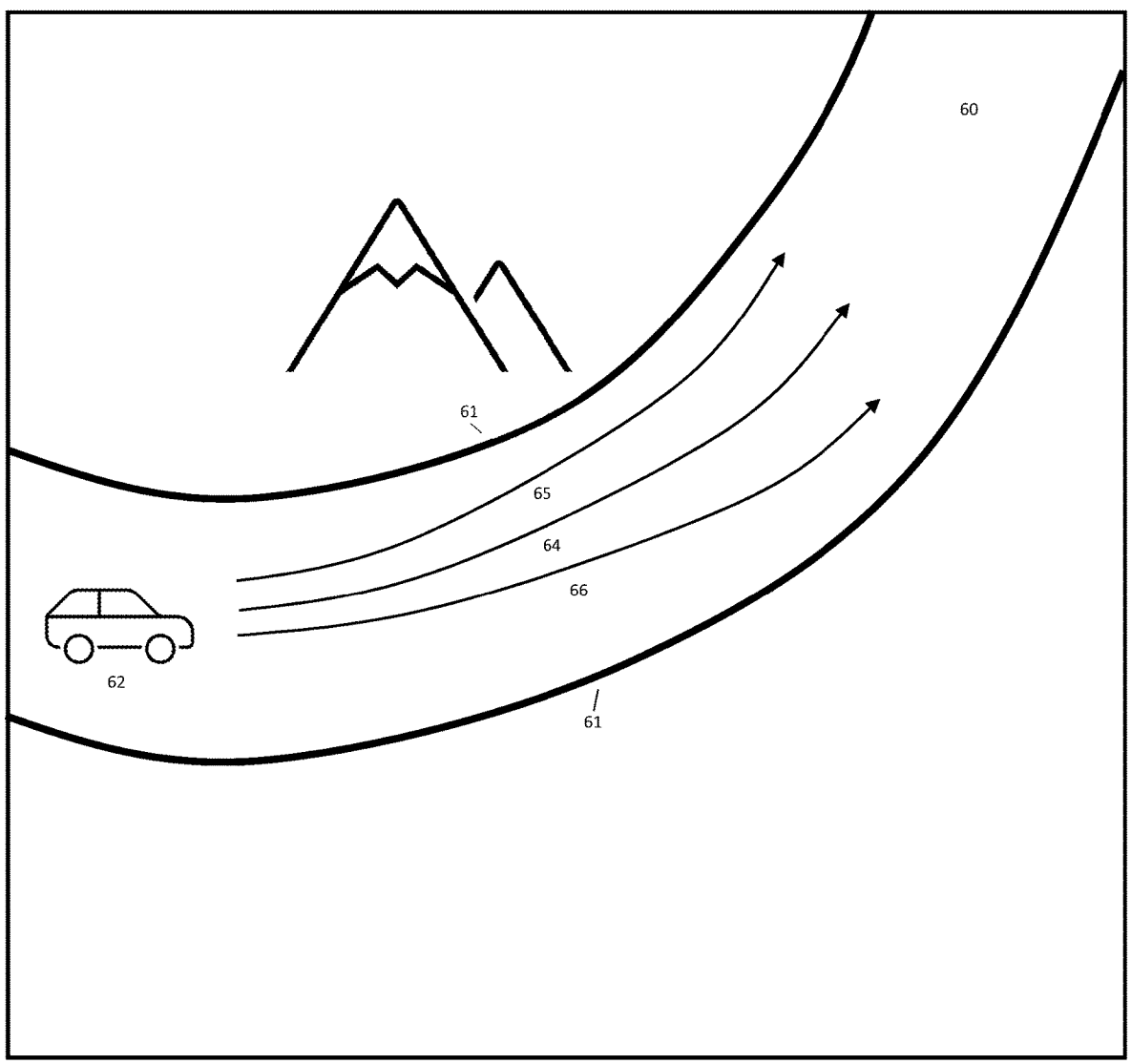
Figure 5:
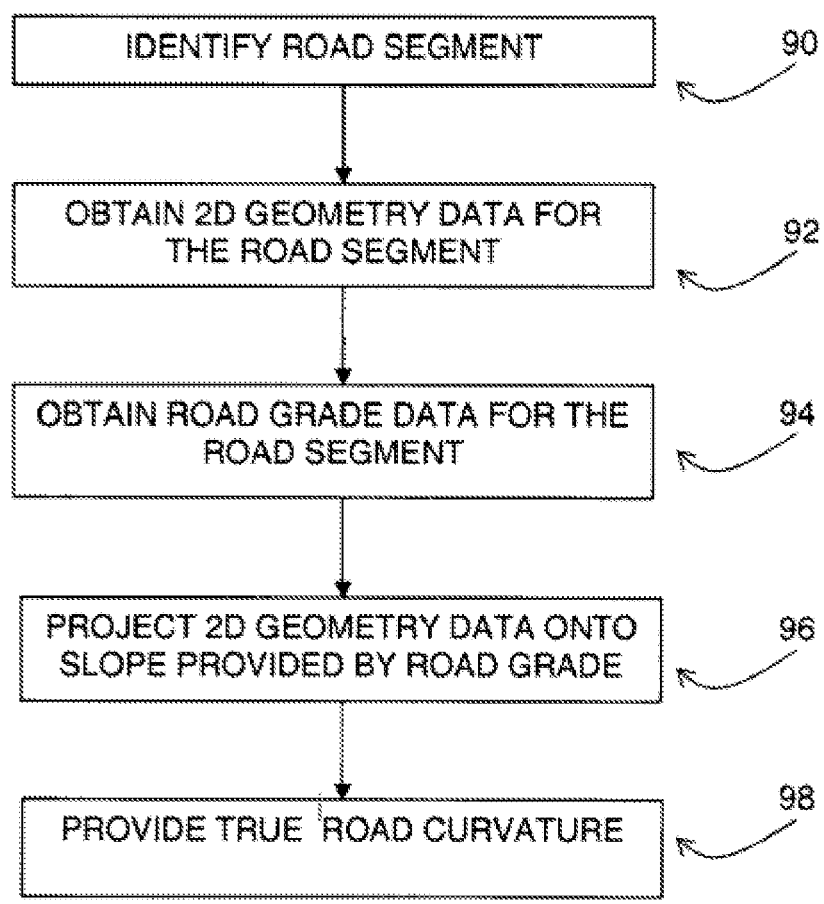
Figure 6:
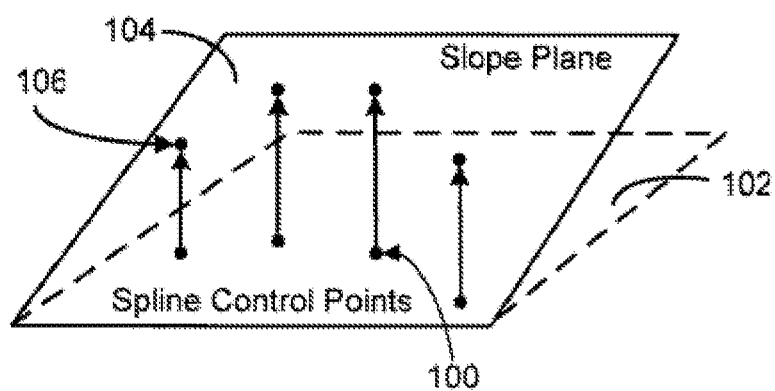

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a block diagram of a geographic database of an example embodiment of the apparatus;

FIG. 3A is a flowchart illustrating the operations performed, such as by the apparatus of FIG. 1, in order to train machine learning models to generate splines;

FIG. 3B is a flowchart illustrating the operations performed, such as by the apparatus of FIG. 1, in order to generate a plurality of splines;

FIG. 3C is a flowchart illustrating the operations performed, such as by the apparatus of FIG. 1, in order to provide a graphical user interface and/or functions thereof;

FIG. 4 is a graphical representation of a curved roadway upon which a passenger sedan is traveling;

FIG. 5 is a flow chart for a method for restoring true road curvature according to one embodiment; and FIG. 6 is a diagram of spline control points being projected onto a slope plane.

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment to generate splines based on driving preferences and patterns. A spline may be described as a piece wise function that interpolates a set of nodes. The term spline may be used to refer to a wide class of functions that are used in applications requiring data interpolation and/or smoothing. The data may be either one-dimensional or multi-dimensional. Spline functions for interpolation are normally determined as the minimizers of suitable measures of roughness (for example integral squared curvature) subject to the interpolation constraints. Smoothing splines may be viewed as generalizations of interpolation splines where the functions are determined to minimize a weighted combination of the average squared approximation error over observed data and the roughness measure.

In order to generate the splines, the method, apparatus, non-transitory computer-readable storage medium, and computer program product of an example embodiment may be configured to train a machine learning model utilizing training examples and/or real-world data. Once trained, the method, apparatus, computer program product, etc. of another example embodiment utilize the trained machine learning model to analyze image data that is collected of roadways, the first machine learning model may then identity one or more road geometries and generate a spline. The method, apparatus and computer program in some embodiments will take this generated spline and then identify one or additional splines in response to end user driving patterns and preferences for a given roadway.

The apparatus, method, etc. described above may be any of a wide variety of computing devices and may be embodied by either the same or different computing devices. The apparatus may be embodied by a server, a computer workstation, a distributed network of computing devices, a personal computer or any other type of computing device, while the apparatus configured to utilize a trained machine learning models to generate splines may similarly be embodied by the same or different server, computer workstation, distributed network of computing devices, personal computer or other type of computing device.

Alternatively, the apparatus, etc. may be embodied by a computing device on board the vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Regardless of the manner in which the apparatus is embodied, however, the apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM), such as but not limited to Long Term Evolution (LTE) or 5G, 6G, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses.

For example, the one or more camera systems 22 can be located upon a vehicle or proximate to it (e.g., traffic cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, method, etc. these cameras are utilized to capture images of a roadway.

The apparatus takes these captured images (via the camera systems 22) and analyzes them to determine various road geometries present. The data captured concerning the types of geometries present on a given roadway may also come from traffic cameras, security cameras, or any other functionally useful source (e.g., historic data, satellite images, etc.). The analysis of the image data may be done by a machine learning model. This model may utilize any functionally useful means of analysis to generate splines for a given roadway, road segment, bike path, etc.

The apparatus, in this embodiment, may generate additional splines based on the initial generated spline in combination with end user driving preferences and patterns.

The locations of the vehicle and geometries which utilize various embodiments of the apparatus may each be identified in latitude and longitude based on a location of the vehicle using a sensor, such as a GPS sensor to identify the location of the vehicle.

In certain embodiments, information detected by the one or more cameras can be transmitted to the apparatus 10, such as the processing circuitry 12, as image data. The data transmitted by the one or more cameras can be transmitted via one or more wired communications and/or one or more wireless communications (e.g., near field communication, or the like). In some environments, the communication interface 16 can support wired communication and/or wireless communication with the one or more camera sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Turning to FIG. 2, the map or geographic database 24 may include various types of geographic data 240. This data may include but is not limited to node data 242, road segment or link data 244, map object data 246, driving preference data 248, or the like (e.g., other data records 250 such as traffic data). The map database 24 may also include cartographic data, routing data, road geometry data, and/or maneuvering data as well as indexes 252. According to some example embodiments, the road segment data records may be links or segments representing roads, streets, or paths, as may be used in calculating a route or recorded route information for determination of one or more personalized routes. The node data may be end points (such as intersections) corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc.

The map database can include data about driving preferences and patterns for respective users or general user profiles (such as in data 248). For example, as an end user drives around their preferred driving mannerisms may be observed by the apparatus and this data may be stored in one or more databases. For a large truck, navigating curves may be done in a conservative way to avoid crossing lane lines, shoulders, etc. Alternatively, a user driving a sports car may wish to have a more thrilling driving experience and execute turns and navigates curves closer to the shoulder or lane line (safety permitting). The apparatus may observe the patterns and use it to generate navigation data (e.g., splines) which reflect the personalized driving patterns. Using this data and/or other data sources the apparatus may also create ready-made driving profiles. These ready-made driving profiles can be selected by an end user when they start using the apparatus to switch from a standard autonomous driving mode to one that is more conservative to provide maximum safety or to a mode one that is more thrilling or varied to provide end users with enjoyment.

The map database may also include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

Referring now to FIG. 3A, the operations performed, such as by the apparatus 10 of FIG. 1, in order to train a machine learning model to predict the preferred manner by which an end user navigates a curve. More, fewer, or different acts or steps may be provided. As shown in block 30, the apparatus includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface.

In accordance with an example embodiment, the apparatus 10 also includes means, such as the processing circuitry 12, the memory 14 or the like, configured to train a machine learning model utilizing the training data set. See block 32 of FIG. 3A. The machine learning model, as trained, is configured to predict the preferred manner by which an end user wishes to navigate a curve.

The apparatus 10, such as the processing circuitry 12, may train any of a variety of machine learning models to do a number of actions including generating personalized splines based upon a single or plurality of images. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models generates a plurality of splines based upon image data with the greatest accuracy. The machine learning model that has been identified as most accurate is thereafter utilized to predict the class of vehicle.

In one example, the machine learning model may be a deep learning neural network computer vision model that utilizes image data of roadways. Various images of different types of curved roadways are provided to the machine learning model to train and improve its accuracy. Various types of road curves may include but are not limited to Horizontal curves, Simple circular curves, Compound curves, Reverse curves, Track transition curves, Spiral curves, Valley/Sag Curves, and Summit curves. Other types of curved road infrastructure can include Cloverleaf Interchanges, Diamond Interchanges, Trumpet Interchanges, All-Directional Interchanges.

In some example embodiments, a balance or trade-off between the accuracy with which the splines are generated and the efficiency with which the machine learning model generates splines is considered. For example, a first set of images may produce the most accurate set of splines, but a second combination of images may produce a set of splines that is only slightly less accurate, but that is significantly more efficient in terms of its prediction. Thus, the second combination of images that provide for sufficient, even though not the greatest, accuracy, but does so in a very efficient manner may be identified by the apparatus 10, such as the processing circuitry 12, as the preferred images to be provided to the machine learning model to generate splines in subsequent instances.

In some embodiments, a training example also includes information regarding a map object, such as a map object that is located at the location at which the image data was captured. One example of a map object is a bridge, and another example of a map object is a railroad crossing. A wide variety of other map objects may exist including, for example, manhole covers, transitions between different types of road surfaces, various forms of infrastructure, or the like.

In some embodiments, the apparatus 10 can be provided real world image data of roadways and their surroundings as mentioned in block 34. For example, as a passenger sedan drives down a road, it may pass various types of road curvatures which may be captured by the camera systems of the apparatus. The apparatus 10 may then identify these one or more types of roadways as noted in block 36. The apparatus 10 may also identify how the end user navigates a given piece of curved roadway to build a record/driving profile for a given end user.

The curve identification data from the machine learning model may then be used by the same or another machine learning model along with related data and/or metadata about the roadway. Such additional data may include, but is not limited to map geometry data, POI data, environment-based feature data, vehicle feature data, historical data, and/or map layer data.

Examples of map geometry data include incoming traffic lanes, number of lanes in total, lane lines, shoulders, the present or upcoming speed limit, overtaking possibilities (e.g., no pass zones), road curvature, natural wear patterns, tire tracks, etc. Examples of POI data include POI proximity, types of POI, operating hours of the nearby POIs. Examples of environment-based feature data include the current or future weather, time of day, visibility (fog, night, lack of streetlights, etc.), seasonality, harvest times, shipping schedules, etc.

Vehicle feature data may include current speed and/or top speed, width/length of a vehicle, vehicle load status (e.g., loaded full versus unloaded); type of tires (tyres), weight of vehicle, number people in a vehicle, and historical routes taken by a given vehicle.

Historic data about a vehicle may include historical driving patterns, typical routes, routes for similar vehicles in the past, general data about how vehicles of a certain type navigate a given curve.

Various other types of map layer data may further include data about entrances and exits from a given POI, historical traffic patterns (e.g., rush hour), interplay between various map objects (e.g., bridges with low clearance which might stop an oversized load), etc. Once trained, the machine learning model may then predict curve navigation by generating a spline based on these various data points and others (block 38).

A non-limiting example of the apparatus 10 predicting curve navigation is that of a passenger car driving down a rural roadway. As the car drives down the road it may approach a winding portion of the road. The apparatus 10 may utilize the passenger car's onboard cameras, end user smartphones, traffic cameras, etc. to identify the curved roadway via various information data points about the road such a road geometry. The road geometry data can include lane lines, markings, shoulders, etc. As the car approaches a given curve, the apparatus 10 in coordination with its various components may identify the curve (as described above) and records how the end user navigates said curve. In this example, the end user is driving a sports coupe on an empty roadway and decides to navigate the curve in a long sweeping route without much braking, maximizing speed as they exit the curve. Based on the end user's approach, the apparatus 10 may then, as the end user approaches the next curve on the road calculate splines for navigating the new, upcoming curve.

The first spline may be calculated based off roadway data such as road geometry which indicates the mid-line of the roadway (e.g., middle divider or lane line). The apparatus 10 then may also generate a second spline based on additional roadway geometry identified by the system (e.g., outside border of the road, shoulder, oncoming lanes, etc.) as well as driving preference data. In this example, the first spline generated by the apparatus 10 may provide a route which navigates the curved portion of the roadway in the middle of the roadway. The calculation of the second spline may consider the driver's preference to go fast, sweep across the lane (or even onto the shoulder or into another lane) thus accommodating for such driving preferences. The apparatus 10 may also generate additional splines, offset from the first and second splines, calculated in the manner above (or in any other functional manner) to provide a variety of driving experiences to the end user.

This prediction data can then be utilized in various ways. The apparatus 10 may alert the driver of the coupe (and others) via graphical user interface (GUI) that there could be a chance to navigate the curve in a different manner. The apparatus may also update one or more map layers and/or databases to account for different splines. In some embodiments, the predicted splines may be used to activate autonomous or highly assisted driving features. For example, if the coupe discussed above had self-driving capabilities the apparatus 10 could activate the self-driving mode in response to the availability of a shoulder or other lane of traffic to accelerate around a given curve in a safe manner that is also more entertaining and provides to the end user a varied driving experience.

The prediction data may be utilized in other ways. For example, the apparatus 10 may provide to the end user updated route guidance which avoids certain areas with curved roadways they dislike (e.g., large trucks which might struggle with such a roadway). Continuing with the example above, the apparatus 10 may look at existing map data to determine a better route which avoids such issues and improves safety for all drivers.

As mentioned before, the apparatus 10 may feature multiple machine learning models. These models and other data may be used by the apparatus 10 to not only analyze real time driving delay situations as mentioned above but also examine existing map data to identify other similarly situated roadways. These similar roadways will have similar road geometries, map objects, etc. So, for example, if there was another winding rural roadway the apparatus 10 may be able to detect such a similar roadway and provide alerts, route guidance, etc. to an end user.

Other examples of the apparatus 10 at work include urban settings in addition to rural settings. Urban settings are frequently hampered by heavy traffic, narrow lanes, public transit, etc. In one embodiment, the apparatus 10 may be configured to run on an end user device such as a smart phone or tablet. The apparatus 10, running on an end user device may be used by not only automobile drivers but also drivers of motorcycles, mopeds, bicycles, scooters, etc. In one no limiting example, a delivery driver on a scooter may utilize the apparatus 10 via their smart phone mounted on the scooter. The smartphone's camera, traffic cameras, other vehicle's camera, etc. may be utilized by the apparatus 10 to capture image data and monitor for different roadway curvatures. As the end user drives around on their scooter, they may encounter a curved street with a bus lane. The camera system 22 may capture an image of the roadway as the scooter approaches and the apparatus 10 may confirm the type of roadway curvature present.

Once the roadway curve has been identified, the apparatus 10 will examine various road geometries. In this example such a geometry could be a lane line which indicates the boundaries of the lane the scooter is currently traveling in. The apparatus 10 may then generate a first spline which navigates the curve in the roadway, staying within the current lane. The apparatus 10 may then also examine various other road geometries for the curved roadway to determine if other splines may be generated (which are safe) but provide a varied driving experience. In this example, another road geometry identified is a bus lane next to the lane the scooter is currently traveling in. The apparatus 10 may then generate a second spline for navigating the curved road, this second spline traversing the current lane and bus lane to provide a varied driving experience.

FIG. 3B illustrates the operations performed, such as by the apparatus 10 of FIG. 1, to generate a plurality of splines for navigating a given roadway. More, less, or different step may be followed. As shown in FIG. 3B at a first step the apparatus 10 may obtain image data of a roadway (block 40). It should be noted the apparatus 10 can identify roadway segments, geometries, map objects, etc. in real time via the camera system 22 and/or by existing map databases 24. As mentioned above, the roadway identified may be curved thus necessitating a spline for navigation. The splines generated by the presently disclosed apparatus 10, system, user interface, etc. need not me limited to only markedly curved roadways, however. Most roadways are not perfectly straight and, even if they were, an end user might not navigate down said roadway in a straight path. Many drivers naturally drift within their designated driving lane or even out of it (safety permitting) consciously or subconsciously. The present apparatus 10 may account for these variations in navigation by generating multiple navigation splines.

After the apparatus 10 obtains image data of a given roadway, the apparatus in some examples, will then identify one or more road geometries (block 42). The road geometries such as lane lines, road boundaries, etc. are used to generate a first spline. The first spline generated (block 44) in this example may be one that navigates a given roadway in a standard manner relative to the identified road geometries. In this example, the first spline represents travel straight down the middle of the lane with little to no deviation. Such a path should be safe and efficient but could be jarring and mechanical in nature to those following the spline on their own accord or traveling in an automated vehicle following the path.

It should be noted that the splines discussed herein may be generated based on any relevant data points and may, in some embodiments utilize the NURB (Non-Uniform rational B spline technique) to calculate the splines.

To avoid rigid, mechanical driving the apparatus 10, in some embodiments may identify one or more additional road geometries for a given segment of roadway. These additional road geometries may be identified by interpolation (block 46) and be the same or additional lane lines, road boundaries, etc. within a certain range (e.g., 3 meters, 10 meters, etc.) from the first road geometry. Once identified, the additional road geometries are used to generate a second spline (block 48) which is offset from the first spline generated for a given roadway. This second spline may be more or less curved than the first spline to provide a less mechanical driving experience. Continuing with the example above, the second spline may also traverse a single lane of traffic but instead of traveling straight down the middle of the lane, the car may drift a bit across the width of the lane to provide a varied driving experience.

This gentle drifting can be both enjoyable and utilized to improve safety. The driving patterns of end users may be recorded as utilized to generate splines which are personalized. For example, when driving on a mountain road an end user may wish to steer towards the middle of the roadway versus drifting towards the outside edge which features a steep drop-off. The present apparatus 10 may observe these driving tendencies for a given end user or for users in general (e.g., truck drivers). In this example, as a truck driver approaches a roadway with a shoulder on one side and steep mountain drop on the other, the apparatus 10 may generate a first spline which navigates the middle of the roadway. However, this path might not be ideal and thus the apparatus 10 may also generate a second spline which navigates away from the middle of the roadway towards the inside and shoulder instead. This second spline may provide enhanced safety and comfort for an end user.

Alternatively, in the same situation a different end user (e.g., motorcyclist) might wish to venture closer to the outside edge of the roadway to avoid vehicles traveling the opposite direction coming over the midline and/or for a more thrilling ride. The present apparatus 10 may account for this preference and generate one or more splines which traverse the roadway in this manner.

FIG. 3C illustrates the operations performed, such as by the apparatus 10 of FIG. 1, to provide a user interface capable of generating a plurality of splines. More, fewer, or different acts or steps may be provided. As shown in FIG. 3C, at a first step a user interface (UI) may receive a destination input from an end user (block 50). This input of destination may be received via an end user device graphical user interface (GUI) running upon a smartphone, tablet, integrated vehicle navigation system, etc. After this destination is input, the UI may access one or more geographic databases (block 52). These geographic databases may resemble the ones shown in FIG. 2. Once the databases are accessed, the UI may then determine a route (block 54) which may, in some embodiments, feature a plurality of navigation splines which allow for a varied driving experience around curves, drifting within lanes, etc. As mentioned above, the calculation of these splines may be based on any functionally capable means including identification of roadway geometries and utilizing end user driving patterns as datapoints for such a calculation.

Notwithstanding how the apparatus generates the splines, this information may then be used to route the end users along certain road segments (as well as specific portion or areas of those road segments) when generating a route. The route determined by the apparatus 10 may then be displayed to then end user (block 56) via the same or a different user interface. In other examples, the UI may adjust an entire route towards or away from certain roadways or road segments based on driving patterns, etc. For example, if an end user consistently choses to navigate in a conservative manner through mountain passes (e.g., risk adverse) the UI may avoid these roadways for a given route.

The apparatus can take any number of additional actions (or in place of) what is called for in block 56. For example, the apparatus may provide audio guidance instead of a visual display. The navigation instructions may also be provided to an autonomous vehicle for routing (for example, without any display to the user). Additionally, the user interface may, in some embodiment, further comprise a processor and a memory that contains instructions to perform the steps shown in FIG. 3C.

Turning to FIG. 4, some of the examples discussed above are illustrated. Specifically, a sedan 62 is shown driving down a curved roadway 60. As shown in FIG. 4, the sedan 62 is utilizing the apparatus 10 to generate a first spline 64 and additional splines 65 and 66. The apparatus identifies the curved roadway 60 via images from a camera system 22 (of the sedan), traffic cameras, etc. and feeds those images into a machine learning model which generates the splines. The machine learning model may generate the splines in relation to one or more road geometries (in this case the road boundary lines 61).

It should be noted that the sedan 62 in this example represents any vehicle. Such vehicles may be standard gasoline powered vehicles, hybrid vehicles, an electric vehicle, a fuel cell vehicle, and/or any other mobility implement type of vehicle. The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

As mentioned above, the splines generated in this non-limiting example are based at least in part upon road geometries. The first spline 64 travels approximately down the midline of the roadway, equidistant between the two road boundary lines 61. Based on the driving patterns of the end user driving the sedan 62, the apparatus 10 may then generate additional splines which reflect alternative paths to traverse the roadway 60. Roadways are commonly wide enough to accommodate multiple vehicles and each lane of a roadway may be wide enough to allow vehicles room to drift from side to side (US highways have a 12 ft (3.7 m) standard lane width).

In the example shown, there is a second spline 65 which is offset from the first spline towards the inside of the roadway 60. The roadway 60 in this example happens to be next to a mountain and some users may wish to move closer to the mountain for any number of reasons. Alternatively, end users may wish to keep a safe distance from the mountain (e.g., danger of falling rocks or an avalanche) and the apparatus 10 provides a third spline 66 offset from the first spline 64 towards the outside of the roadway 60. The second and third splines may be generated based off additional road geometries interpolated or identified by the apparatus 10.

The splines generated may be used for automated or highly assisted driving or displayed to end users on GUI for use when they manually navigate a roadway. The spline data may also be used to generate alerts and update map layers for use by other end users.

As mentioned above, a user interface (in coordination with the apparatus 10, etc.) may be used to both generate and display the splines in some embodiments. In these embodiments and others, the UI may also develop a user profile for each end user. When an end user begins using the UI, there may be a "cold start" functionality built into the UI which allows the user to select their preferred driving mannerisms from a set of predefined driving modes such as no lane drift, low lane drift, high lane drift, and extreme lane drift. These predefined modes will dictate at least some of the splines generated by the UI. Over time, the UI can adjust based on user feed back to refine a given driving mode/user profile to achieve a custom driving experience for each end user.

For example, if an end user wishes to drive very cautiously in the mountains and crowded city streets, the UI will account for this. Then, if the user drives more freely outside the city on long open county roads, the UI will also note this different driving pattern and begin to account for it as well. Ultimately this will enable a user's driving preference to be varied depending on various factors including road geometry, time of year, driving conditions, etc.

Mentioned above is that the apparatus will generate splines which allow for varied driving in a safe manner. These safety considerations are paramount and the apparatus, UI, system, etc. disclosed herein will always check for oncoming traffic, other vehicles, road hazards, and any other risks or dangers to a driver, pedestrians, etc. before generating any spline which deviates outside the normal driving path of a given vehicle. The system is not intended to violate or impeded any laws (traffic or otherwise).

FIG. 5 is a flow chart representing the steps of a method for determining true road curvature and generating a spline. As discussed above, any functional means of generating a spline may be utilized by the present apparatus 10. Some methods to calculate splines are shown in U.S. Pat. No. 8,204,680 incorporated herein by reference. The apparatus may generate, calculate, and/or interpolate 2D and/or 3D splines. In one embodiment, the apparatus 10 may implement a road geometry application software program (e.g., UI) to perform the method shown. At step 90, the method identifies a road segment for which to determine road curvature. Typically, the identified road segment is a road segment that a vehicle 62 (see FIG. 4) is currently traveling on or a road segment that the vehicle is approaching. To identify the road segment, the apparatus 10 implements GPS data and other data stored in the geographic database 24. Using this data, the apparatus 10 performs map matching to identify the road segment on which the vehicle is currently traveling. At step 92, the method obtains data indicating the 2D geometry for the road segment identified in step 90 from the geographic database 24. In one embodiment, the data indicating the 2D geometry comprises spline control points. At step 94, the method obtains road grade data for the road segment from the geographic database 24. At step 96, the 2D geometry data is projected onto a slope provided by the road grade data.

FIG. 6 illustrates an example of the apparatus 10 projecting road curvature and a spline. In one embodiment, the spline control points 100 comprising the coordinate pairs of latitude and longitude may be viewed as residing on a horizontal plane 102. The road grade data provides a slope (incline or decline) that defines a slope plane 104. The affine properties of B-splines allow the spline to be projected onto the slope. As shown in FIG. 6, the spline control points 100 are projected onto the slope plane 104 to provide projected spline control points 106. The projected spline control points 106 located on the slope plane 104 provide a representation of true road curvature for the road segment. The projection of the 2D geometry onto the slope plane restores the altitude components to the shape.

Referring back to FIG. 5, at step 98, the true road curvature provided by the projected spline control points 106 located on the slope plane is provided to a navigation GUI or an automated driving system. In one embodiment, the slope plane 104 with projected spline control points 106 may be rotated to horizontal to provide the restored road curvature as two-dimensional spline control points. In another embodiment, the projected spline control points may be provided as coordinate triples with z-plane components provided from the slope plane 104. In one embodiment the data indicating the 2D geometry includes a knot vector. For this embodiment, the knot vector does not change when the control points are projected onto the slope. Therefore, in this case, the projected spline control points 106 and original knot vector are provided to the apparatus 10. This data can then be used by the apparatus to generate splines.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   identifying one or more geometries that represent a portion of a road network;
   calculating, by a processor, a first spline curve from the one or more geometries;
   interpolating, by a processor, one or more additional geometries that represent a different portion of the road network;
   calculating, by a processor, at least a second spline curve from the one or more additional geometries, wherein the second spline curve is derived, at least in part, from one or more spline control points and personalized driving preference data, wherein the driving preference data includes at least one or more end user driving pattern; and
   activating or directing an autonomous driving control of a vehicle in response to the calculated second spline curve, wherein the autonomous driving control is vehicle steering, acceleration, or braking.

2. The method of claim 1, wherein the one or more geometries identified is a road boundary.

3. The method of claim 1, wherein the spline curves calculated are stored in a database.

4. The method of claim 1, wherein the one or more geometries are identified by image data.

5. The method of claim 1, further comprising updating a map layer with the calculated spline curves.

6. The method of claim 1, further comprising providing an alert in response to the calculated spline curves.

7. An apparatus configured to calculate a plurality of splines, the apparatus comprising at least one processor and at least one memory storing computer program code, the at least one memory and the computer program code configured to, with the processor, cause the apparatus to at least:
   obtain image data of at least one roadway;
   identify one or more geometries that represent a portion of the at least one roadway;
   calculate, by a processor, a first spline curve from the one or more geometries;
   interpolating, by a processor, one or more additional geometries that represent a different portion of the roadway;
   calculate, by a processor, at least a second spline curve from the one or more additional geometries, wherein the second spline curve is derived, at least in part, from one or more spline control points and personalized driving preference data, wherein the driving preference data includes at least one or more end user driving pattern; and
   activating or directing an autonomous driving control of a vehicle in response to the calculated second spline curve, wherein the autonomous driving control is vehicle steering, acceleration, or braking.

8. The apparatus according to claim 7, wherein the at least one memory and the computer program code are further configured to, with the processor, cause the apparatus to receive an indication of a location of the vehicle, and wherein the at least one memory and the computer program code are configured to, with the processor, cause the apparatus to display a plurality of splines proximate the location of the vehicle.

9. The apparatus according to claim 7, wherein the at least one memory and the computer program code are configured to, with the processor, cause the apparatus to update a map database.

10. The apparatus according to claim 7, wherein the one or more geometries that represent a portion of the at least one roadway are road boundaries.

\* \* \* \* \*